Figure 2:
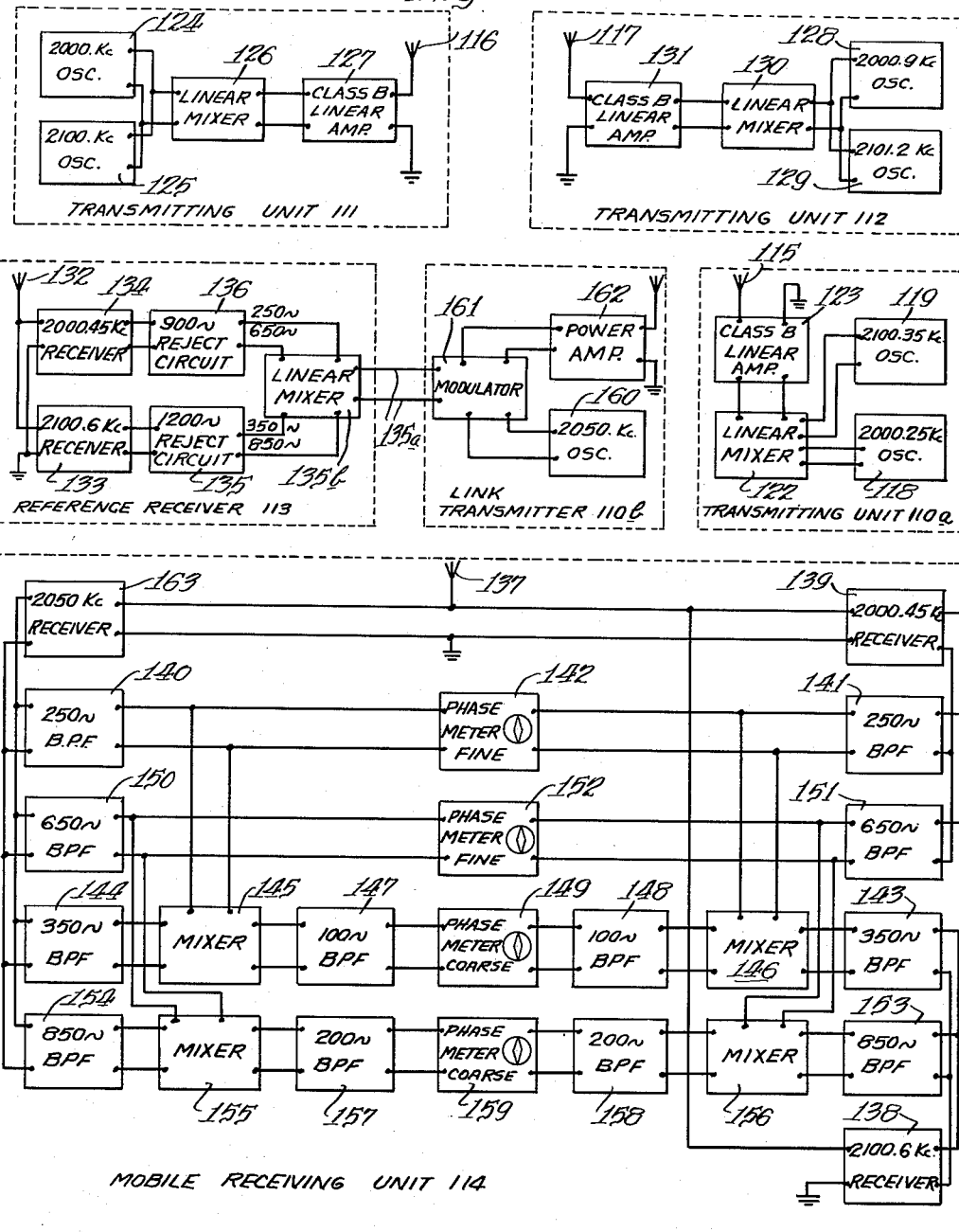

Jan. 10, 1956    E. H. MAHONEY    2,730,714
RADIO LOCATION SYSTEM
Filed April 23, 1954    2 Sheets-Sheet 1
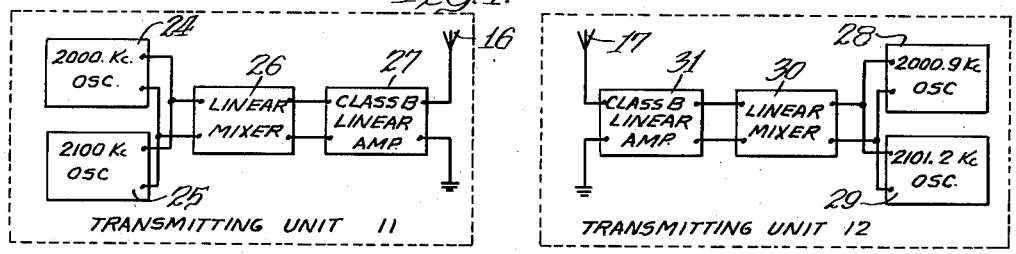
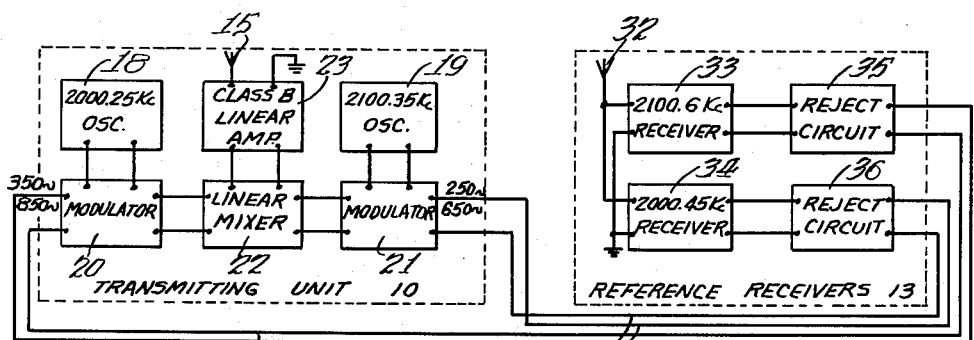
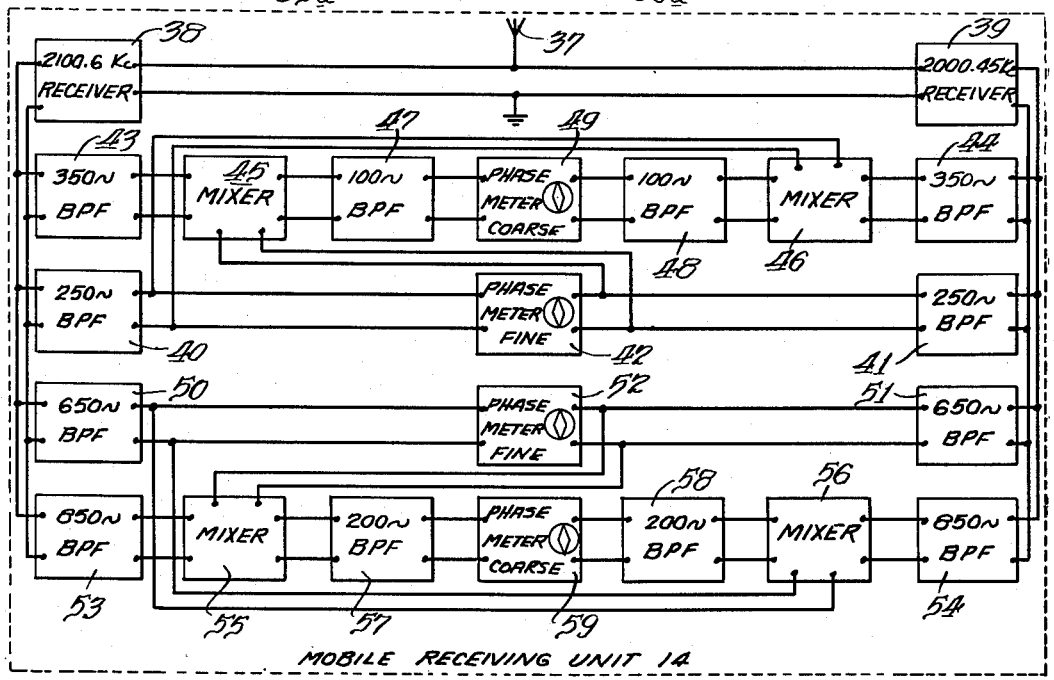
INVENTOR.
Edward H. Mahoney
BY
Mason, Kolehmainen, Rathburn & Wyss
Attys.

Jan. 10, 1956  E. H. MAHONEY  2,730,714
RADIO LOCATION SYSTEM
Filed April 23, 1954  2 Sheets-Sheet 2

INVENTOR.
Edward H. Mahoney
BY
Mason, Kolehmainen, Rathburn & Wyss
Attys.

United States Patent Office 2,730,714
Patented Jan. 10, 1956

2,730,714

RADIO LOCATION SYSTEM

Edward H. Mahoney, Tulsa, Okla., assignor to Seismograph Service Corporation, Tulsa, Okla., a corporation of Delaware Application April 23, 1954, Serial No. 425,199

20 Claims. (Cl. 343—105)

The present invention relates to radio location systems, and more particularly to improvements in radio location systems of the continuous wave phase comparison type.

Radio location systems of the class mentioned usually comprise position signal transmitters located at three or more known geographically separated points, and receiving facilities aboard each mobile craft the position of which is to be determined for receiving the signals radiated from the position signal transmitters. In such systems, the continuous waves radiated from each pair of transmitters produce standing waves in space, the phase relationship of which changes as a function of changing position between the two transmitting points. More specifically, the standing waves produced by each pair of transmitters of the system are characterized by isophase lines which are hyperbolic in contour about the transmitting points as foci. On a line connecting the pair of transmitters, these isophase lines are spaced apart a distance equal to one-half the mean wave length of the radiated waves and have diverging spacings at points on either side of this base line.

With this system arrangement, the position of a receiving point relative to a pair of adjacent hyperbolic isophase lines or more particularly within the lane defined by a pair of adjacent hyperbolic isophase lines, may be determined by measuring the phase relationship between the continuous waves radiated from the pair of transmitters. Since the point of location of the receiving point along the zone separating the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or, alternatively, so to arrange the system that phase shifts between the radiated waves are compensated during the phase comparing operation.

Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining systems. To obviate this problem, systems of the continuous wave hyperbolic type have been proposed in which the phase shift problem is obviated by utilizing the so-called "heterodyne principle" disclosed and broadly claimed in Honore Patent No. 2,148,267.

While the described arrangement for obviating the phase synchronization problem is entirely satisfactory, it entails the use of two carrier channels in addition to the three or four channels taken up by the three or four continuously operating survey transmitters, in order to make up a complete system. It is desirable, however, that the channel frequencies be located adjacent the broadcast band or at least below the ultra-high frequency band in order to obviate the problem of line-of-sight transmission, which, of course, necessitates the location of a number of channel frequencies in the most crowded portion of the frequency spectrum, at least insofar as operations in the United States are concerned. Since frequency allocations in this band must be maintained at a minimum, one of the principle problems encountered in the operation of phase comparison systems is the necessity for reducing the number of frequency channels required.

Another problem encountered in the operation of continuous wave systems is that of eliminating ambiguity from the phase measurements which provide the desired position information. Thus while the phase measurements identify the position of the receiving station within two lanes defined by two intersecting pairs of hyperbolic isophase lines, they do not indicate the pair of lanes in which the indications are obtained. This means that in operating the system the geographic location of the receiving system must be known at the start of movement of the receiving system relative to the transmitting stations and, furthermore, that the successive lanes traversed must be counted as the receiving station is moved relative to the grid-like pattern of hyperbolic lines defining the various lanes. It also means that a mobile craft entering the radiation pattern of the transmitters cannot utilize the radiated signals to determine its position without employing auxiliary equipment to determine the approximate position of the craft relative to the signal transmitters.

Various arrangements have been proposed for overcoming this so-called lane ambiguity problem. By far the most promising solution to the lane ambiguity problem yet discovered, relates to a system arrangement in which the difference frequency principle as disclosed in Hawkins Patent No. 2,652,558 granted September 15, 1953, is used to produce position indications having separate sensitivities, termed phase sensitivities, insofar as the lane widths or spacing of the isophase lines is concerned. More specifically, a plurality of low phase sensitivity position indications and a plurality of high phase sensitivity position indications are derived from signals which are radiated in pairs from each of the geographically separated signal transmission points, the low phase sensitivity indications being effective to locate the range of the high phase sensitivity indications and being characterized by widely spaced phase coincidences, representing large lane widths, and the high phase sensitivity indications being characterized by closely spaced phase coincidences, representing small lane widths. The high and low sensitivity indications are obtained by concurrently radiating at least two signals from each of the transmitting points, producing pairs of beat frequency signals in accordance with the heterodyne principle described in the Honore patent, and then heterodyning the resultant beat frequency signals to produce position indicating and reference signals for phase comparison which have phase sensitivities determined by phantom frequencies corresponding to the difference between the mean frequencies of the carrier waves from which the pairs of beat frequency signals are derived.

Bu utilizing the so-called difference frequency lane ambiguity resolution feature in combination with the heterodyne principle, the problem of phase synchronization between widely separated transmitters and the problem of lane identification, i. e., identification of the particular high phase sensitivity lanes within which a receiving point is located, are completely obviated. However, practical utilization of these principles in combination involves simultaneous radiation of two signals having closely spaced frequencies from each of the transmitting points. More specifically, it may become necessary to radiate two signals having frequencies separated by as little as one kilocycle simultaneously from the radiating antenna of each of the transmitting points. This gives rise to the problem of introducing high powered signals of closely related frequencies into the antenna circuit at each of the transmitting points without generating strong inter-modulation or side band components which not only interefere with operation of the receiving units of the system, but may result in objectionable interference in frequency bands other than the band in which the two primary signal frequencies fall.

The latter problem has been solved by the use of a linear signal transmission channel common to all of the signals generated at each transmitting station for feeding a single antenna circuit as disclosed and broadly claimed in copending application Serial No. 425,271 filed April 23, 1954, in the name of William R. Hunsicker and assigned to the same assignee as the present invention.

All of the systems thus far proposed for using the difference frequency lane ambiguity resolution feature in combination with the heterodyne principle in order to provide at least two low phase sensitivity indications and two high phase sensitivity position indications have required the use of rather complex transmitting and/or receiving equipment, a large number of transmitters and a large number of carrier wave receivers. Obviously, equipment of this complexity is expensive and is also difficult to maintain in continuous operation. Certain of the arrangements heretofore proposed for solving the lane ambiguity problem by utilizing both the "heterodyne principle" and the "difference frequency principle" have required the location of receiving equipment closely adjacent one or more of the transmitting stations of the system. This gives rise to the problem of preventing the receivers from becoming blocked by the radiation of carrier waves from adjacent transmitters which in many instances differ in frequency from the frequency to which the adjacent receiver is tuned by only a few hundred cycles or less. Thus, the problem of receiver blocking, which may render the entire system inoperative, in certain installations may become acute.

It is an object of the present invention, therefore, to provide a radio position determining system of the character described which combines economy of the frequency spectrum with freedom from phase synchronization problems and yet provides precise and non-ambiguous position indications to any desired number of system users.

It is another object of the invention to provide a radio position location system of the character described which is so arranged that both high phase sensitivity and low phase sensitivity position indications may be obtained at any number of receiving points while employing a minimum number of position indicating signal frequencies suitable for efficient long range propagation.

It is a further object of the invention to provide an improved transmission system for use in radio location systems of the character described which reduces the amount of required equipment and is still free from all of the above mentioned difficulties.

It is likewise an object of the present invention to provide improved receiving equipment for use in radio location systems of the above indicated character.

The invention, both as to its organization and method of operation, together with further objects and advantages thereof, will best be understood by reference to the specification taken in connection with the accompanying drawings in which:

Fig. 1 diagrammatically illustrates an improved radio location system characterized by features of the present invention; and Fig. 2 diagrammatically illustrates a modified embodiment of the present improved radio location system.

Referring now to the drawings and more particularly to Fig. 1 thereof, the present improved radio location system there illustrated comprises a reference receiver 13 spaced from three geographically separated transmitters or transmitting units 10, 11 and 12 for radiating position signals to any number of mobile receiving units, one of which is generally identified by the reference numeral 14, which may be carried by vessels or vehicles operating within the radius of transmission of the three identified transmitting units. The center transmitter 10 is preferably spaced at approximately equal and relatively large distances from the end transmitting units 11 and 12 and these three units are so positioned that the base line connecting the points of location of radiating antennas 15 and 16 of the units 10 and 11, respectively, is angularly related to the line connecting the points of location of radiating antennas 15 and 17 of the units 10 and 12. In order to prevent the blocking of the receiving equipment at the reference receiver 13, this unit is preferably spaced at some distance from the location of the center transmitter 10 and is, of course, spaced considerable distances from the respective locations of the end transmitters 11 and 12. Alternatively, this blocking problem might be solved by the use of suitable attenuators or directionalized antennas which would permit the reference receiver to be located relatively close to the center transmitter 10.

Briefly considered, the equipment provided at the center transmitter 10 comprises two oscillators or signal generators 18 and 19 for developing output signals having frequencies of 2000.25 kilocycles and 2100.35 kilocycles, respectively, a pair of modulators 20 and 21 each associated with one of the oscillators and adapted to modulate the signals developed thereby with reference signals, a linear mixer circuit 22, and a class B final amplifier 23 through which signals derived from the oscillators 18 and 19 are impressed upon the transmitter antenna circuit including the radiating antenna 15. The equipment provided at the end transmitter 11 includes two oscillators or signal generators 24 and 25 for developing output signals having frequencies of 2000 kilocycles and 2100 kilocycles, respectively, a linear mixer circuit 26 to which both of the signals developed by the oscillators 24 and 25 are applied, and a class B final amplifier 27 for amplifying both of the signals applied to the mixer and impressing them upon the transmitter antenna circuit which includes the radiating antenna 16. The equipment provided at the end transmitter 12 comprises two oscillators or signal generators 28 and 29 which develop output signals having frequencies of 2000.9 kilocycles and 2101.2 kilocycles, respectively, a linear mixer circuit 30 to which both of these output signals are applied and a class B linear final amplifier 31 for amplifying the signal output of the mixer and impressing the resulting signal upon the antenna circuit including the radiating antenna 17. It will be appreciated that since the end transmitting units 11 and 12 do not include receiving equipment, no problem of receiver blocking is encountered at either of these stations. The reference receiver 13, which functions to obviate the aforementioned difficulties attendant upon phase synchronization of the carrier wave signals radiated by the transmitters 10, 11 and 12, includes an antenna circuit having a single antenna 32 for collecting signals radiated from the three transmitters and for impressing these signals upon the input terminals of a pair of receivers 33 and 34. The receiver 33 is center tuned to a carrier frequency of 2100.6 kilocycles and, accordingly, is designed to receive the 2100.35 kilocycle signal radiated from the center transmitter 10, the 2100 kilocycle signal radiated from the end transmitter 11 and the 2101.2 kilocycle signal radiated from the end transmitter 12. The receiver 34 is center tuned to a frequency of 2000.45 kilocycles and, accordingly, is designed to receive the 2000.25 kilocycle signal radiated from the center transmitter 10, the 2000 kilocycle signal radiated from the transmitter 11 and the 2000.9 kilocycle signal radiated from the transmitter 12. Each of the receivers 33 and 34 functions to heterodyne in pairs the three carrier wave signals to which it is responsive and to reproduce the three difference frequency or beat frequency signals between these pairs of carrier waves. Each of these receivers also reproduces modulation signals which, as will be described more fully hereinafter, appear upon both of the carrier wave signals radiated by the center transmitter 10. In order to eliminate all of the reproduced signals except for two pairs of the reproduced beat frequency signals, there is associated with each of the receivers a frequency selective reject circuit, these circuits being designated by the reference characters 35 and 36. The signals passed by the reject circuit 35 are applied over signal connectors 35a to the modulator 20 at the center transmitter 10 where these signals are amplitude modulated upon the signal developed by the oscillator 18. Since, as previously indicated, the reference receiver 13 is preferably located at some distance from the center transmitter 10 the signal connectors 35a may extend between these two spaced units. In similar manner, signal connectors 36a may extend between the reference receiver 13 and the center transmitter 10 in order to apply the output signals of the reject circuit 36 to the modulator 21 for amplitude modulation upon the signal developed by the oscillator 19.

As will be evident from the above description, a single radiating antenna is provided at each of the signal transmission points where the transmitters 10, 11 and 12 are located. In this regard it will be understood that radiation of all signals produced at each transmitting station may be radiated from the same antenna without generating intermodulation or undesirable side band components by the provision of linear signal transmission channels including the linear mixer and the linear class B final amplifier at each of the transmitting stations as disclosed and broadly claimed in the above identified application to William R. Hunsicker. The radiation of all the signals produced at each transmitter from the same radiating antenna enhances the accuracy of the position indications produced by radio location systems of the phase comparison type and at the same time minimizes the cost of antenna construction and system maintenance.

Referring now to the mobile craft receiver 14, this receiver comprises a single antenna circuit 37 for collecting all of the signals radiated from the transmitters 10, 11 and 12 and for impressing the same upon the input terminals of two receivers 38 and 39. The receiver 38, like the receiver 33 at the reference receiver 13, is center tuned to a frequency of 2100.6 kilocycles and, accordingly, is designed to receive the 2100.35 kilocycle signal radiated from the center transmitter 10, the 2100 kilocycle signal radiated from the transmitter 11 and the 2101.2 kilocycle signal radiated from the transmitter 12. The receiver 38 functions to heterodyne in pairs these three carrier wave signals in order to develop three beat frequency or difference frequency signals at its output terminals. The receiver 38 also reproduces at its output terminals the signals modulated by the modulator 21 upon the 2100.35 kilocycle signal radiated by the center transmitter 10. The receiver 39, on the other hand, is center tuned to a carrier frequency of 2000.45 kilocycles, and, accordingly, is designed to accept the 2000.25 kilocycle signal radiated from the center transmitter 10, the 2000 kilocycle signal radiated from the transmitter 11 and the 2000.9 kilocycle signal radiated from the transmitter 12. The receiver 39 functions to heterodyne in pairs the three accepted carrier wave signals in order to reproduce at its output terminals three beat frequency or difference frequency signals. This receiver also reproduces the reference signals modulated by the modulator 20 upon the 2000.25 kilocycle signal radiated from the center transmitter 10. The mobile receiver 14 further comprises facilities including 250 cycle band pass filters 40 and 41 and a phase meter 42 for providing fine or narrow lane position indications with reference to hyperbolic isophase lines having the signal radiating antennas 15 and 16 at the transmitters 10 and 11 as foci, and coarse or wide lane position indicating facilities comprising the filters 40 and 41, 350 cycle band pass filters 43 and 44, two mixers 45 and 46, two 100 cycle band pass filters 47 and 48 and a phase meter 49 for providing position indications with reference to widely spaced hyperbolic lines also having the signal radiating antennas 15 and 16 at the transmitters 10 and 11 as foci. The mobile receiver 14 further comprises fine or narrow lane indicating facilities including two 650 cycle band pass filters 50 and 51 and a phase meter 52 for providing indications relative to hyperbolic isophase lines having the signal radiating antennas 15 and 17 as foci, and facilities including the filters 50 and 51, 850 cycle band pass filters 53 and 54, a pair of mixers 55 and 56, two 200 cycle band pass filters 57 and 58 and a phase meter 59 for providing coarse or wide lane position indications relative to widely spaced hyperbolic isophase lines also having the antennas 15 and 17 at the transmitters 10 and 12 as foci.

Referring now to the operation of the above described system, it is pointed out that the transmitters 10, 11 and 12 are operative continuously to radiate pairs of position indicating signals of different frequency thus providing six carrier wave signals for reception at the antenna 32 of the reference receiver 13 and at the antenna 37 of the mobile receiver 14. These frequencies are so grouped that the signals developed by the oscillators 18, 24 and 28 at the transmitters 10, 11 and 12, respectively, forming a first carrier signal group, are separated in frequency by only 900 cycles and thus fall well within a single channel allocation of ten kilocycles as specified by the Federal Communications Commission. A second group of three carrier waves consisting of the signals developed by the oscillators 19, 25 and 29 at the units 10, 11 and 12, respectively, are separated in frequency by only 1200 cycles and also fall within a single ten kilocycle channel allocation. It is, therefore, apparent that the radio location system shown in Fig. 1 utilizes only two frequency channels for providing both fine and coarse position indicating signals to facilitate a determination of the position of the mobile receiver 14. It will also be apparent that by virtue of the fact that the two groups of carrier wave signals are separated in frequency by approximately 100 kilocycles, their selective reception at the reference receiver 13 at the mobile receiver 14 is facilitated. Specifically, receiver 33 at the reference receiver 13 receives the second group of three carrier waves, consisting of the signals developed by the oscillators 19, 25 and 29 at the units 10, 11 and 12, and heterodynes these signals in pairs in order to produce at its output terminals three beat frequency signals having frequencies of 350 cycles, 850 cycles and 1200 cycles, respectively. These three signals are applied to the reject circuit 35 having frequency selective characteristics enabling this circuit to pass both the 350 cycle and 850 cycle beat frequency signals and to reject the 1200 cycle signal. The two signals passed by the reject circuit 35, as previously indicated, are applied through signal connectors 35a to the modulator 20 at the transmitter 10 where both of these signals are continuously modulated upon the 2000.25 kilocycle signal developed by the oscillator 18. The signal output of the modulator 20, comprising a radio frequency signal, simultaneously modulated with two low frequency signals, is applied through the linear mixer 22 and through the linear amplifier 23 for radiation from the antenna 15 to the mobile receiver 14 where the modulation signals function as reference signals in a manner to be described more fully hereinafter. The receiver 34 at the reference receiver 13 receives the first group of carrier waves, consisting of the signals developed by the oscillators 18, 24 and 28 at the units 10, 11 and 12, and heterodynes these three signals in pairs in order to reproduce three beat frequency signals having frequencies of 250 cycles, 650 cycles and 900 cycles, respectively. The receiver 34 also reproduces the modulation signals applied by the modulator 20 upon the 2000.25 kilocycle signal generated by the oscillator 18 at the unit 10. Thus, in addition to the three beat frequency signals just mentioned, the receiver 34 also reproduces two modulation signals having frequencies of 350 cycles and 850 cycles, respectively. The five signals developed at the output terminals of the receiver 34 are applied to the reject circuit 36 which is designed to pass the 250 and 650 cycle beat frequency signals and to reject the 900 cycle beat frequency signal and both the 350 and 850 cycle modulation signals. The output of the reject circuit 36, comprising a pair of beat frequency signals having frequencies of 250 cycles and 650 cycles, is passed over the signal connectors 36a to the modulator 21 for amplitude modulation upon the signal developed by the oscillator 19 at the center transmitter 10. It will be appreciated that the two signals modulated upon the carrier wave of 2100.35 kilocycles radiated by the center transmitter 10 are transmitted to the mobile receiver 14 where these signals function as reference signals in a manner to be subsequently described in detail. It will be understood that the two signals modulated upon the signal developed by the oscillator 19 are reproduced by the receiver 33 at the reference receiver 13. These two modulation signals, having frequencies of 250 cycles and 650 cycles are rejected by the frequency selective reject circuit 35 and thus are not applied to the modulator 20. The rejection of the reproduced modulation signals by the reject circuits 35 and 36 prevents the modulation of reference signals upon improper ones of the carrier waves radiated from the center transmitter 10 and thus insures that the mobile receiver 14 will translate only the desired pairs of reproduced signals into position indications. The rejection of the 1200 cycle and 900 cycle beat frequency signals by the reject circuits 35 and 36, respectively, prevents regeneration and insures that the undesired heterodyne frequencies will not cause intermodulation.

To summarize briefly, each of the end transmitters 11 and 12 continuously radiates a pair of unmodulated carrier waves, while the center transmitter 10 continuously radiates a pair of carrier wave signals each of which is modulated by a pair of reference signals of different frequency.

At the mobile receiver 14, the antenna 37 collects the four unmodulated carrier wave signals radiated by the transmitters 11 and 12 and two modulated carrier wave signals radiated by the center transmitter 10. All of these signals are applied to the input terminals of receivers 38 and 39. The receiver 38 accepts the three carrier waves radiated by the transmitters 10, 11 and 12 which are derived from the signals developed by the oscillators 19, 25 and 29 and heterodynes these three carrier waves to reproduce three beat frequency signals having frequencies of 350 cycles, 850 cycles and 1200 cycles. The receiver 38 also reproduces the two modulation signals of 250 cycles and 650 cycles appearing on the 2100.35 kilocycle carrier wave radiated by the transmitter 10. Thus the output of the receiver 38 comprises five signals each having a different frequency and all applied to the input terminals of the band pass filters 40, 43, 50 and 53. The 1200 cycle beat frequency signal is rejected by all four of these filters and thus does not affect the operation of the equipment at the mobile receiver. However, each of the other four reproduced signals is passed by one of these four band pass filters and rejected by the other three filters thus effectively separating the two modulation signals and 350 and 850 cycle beat frequency signals reproduced by the receiver 38. Receiver 39 accepts the carrier waves radiated by the transmitters 10, 11 and 12 which are derived from the signals generated by the oscillators 18, 24 and 28, respectively, and heterodynes these three carrier waves in pairs to reproduce three beat frequency signals having frequencies of 250 cycles, 650 cycles and 900 cycles. In addition to these three beat frequency signals, the receiver 39 also reproduces the 350 cycle and 850 cycle modulation signals appearing upon the 2000.25 kilocycle wave radiated from the transmitter 10. Thus the output of the receiver 39, comprising five signals of different frequency, is applied to the input terminals of each of the four band pass filters 41, 44, 51 and 54. These four filters function to reject the 900 cycle beat frequency signal reproduced by the receiver 39 and thus prevent this signal from affecting the operation of the position indicating facilities of the mobile receiver. Each of these four filters passes one of the other four signals reproduced by the receiver 39 and rejects the other three thus effectively separating the 350 and 850 cycle reference signals and the 250 and 650 cycle beat frequency signals reproduced by the receiver 39. The 250 cycle beat frequency signal developed by the receiver 39 as a result of heterodyning the 2000.25 kilocycle and 2000 kilocycle carrier waves radiated by the transmitters 10 and 11 is passed by the filter 41 and applied to the right hand set of input terminals of the phase meter 42. To provide a reference signal for phase comparison with this beat frequency signal, the 250 cycle modulation signal appearing on the 2100.35 kilocycle signal radiated by transmitter 10 is reproduced by the receiver 38 and is applied through the band pass filter 40 to the left hand set of input terminals of the phase meter 42. For reasons which will be apparent to those skilled in the art, particularly by reference to the above identified Honore patent, the phase relationship between the two signals developed at the output terminals of the filters 40 and 41 as measured by the phase meter 42 is indicative of the position of the receiving antenna 37 relative to two adjacent and closely spaced hyperbolic isophase lines having the antennas 15 and 16 respectively provided at the transmitters 10 and 11, as foci. More specifically, the spacing between the isophase lines along the base line connecting the two antennas 15 and 16 is equal to one-half wave length of the mean or average of the 2000.25 kilocycle and the 2000 kilocycle signals radiated from the transmitters 10 and 11. At points removed from the base line the isophase lines, of course, diverge and are somewhat more widely spaced. However, since one-half wave length of a signal having a frequency of approximately 2000 kilocycles is equal to about 246 feet and since the phase meter 42 measures and indicates a 360° phase shift during movement of the antenna 37 across one lane, i. e., a distance equal to the spacing between two adjacent isophase lines, it will be understood that the phase meter 42 provides a fine or narrow lane position indication. In similar manner, the 650 cycle heterodyne signal reproduced by the receiver 39 as a result of heterodyning the 2000.25 and 2000.9 kilocycle signals radiated by transmitters 10 and 12 is passed by the filter 51 and applied to the right hand set of input terminals of the phase meter 52. To provide a signal for phase comparison with this beat frequency signal, the 650 cycle modulation signal appearing on the 2100.35 kilocycle signal radiated by transmitter 10 is reproduced by the receiver 38 and is applied through the band pass filter 50 to the left hand set of input terminals of the phase meter 52. This phase meter measures the phase relationship between the two applied signals and thus provides an indication representative of the position of the receiving antenna 37 relative to two adjacent and closely spaced hyperbolic isophase lines having the antennas 15 and 17, respectively, provided at the transmitters 10 and 12, as foci. Specifically, the spacing between the isophase lines along the base line connecting two antennas 15 and 17 is equal to one-half wave length of the mean or average of the 2000.25 kilocycle and 2000.9 kilocycle signals radiated by the transmitters 10 and 12. As previously indicated, at these particular frequencies the spacing between the isophase lines corresponds to a minimum of 246 feet along the base line connecting the antennas 15 and 17 and diverges on either side of this base line. Thus the phase meter 52 provides a fine or narrow lane position indication indicative of the location of the mobile receiving unit between these closely spaced isophase lines.

To obtain a coarse or wide lane position indicating signal, the 250 cycle heterodyne signal passed by the filter 41 is mixed by the mixer 45 with the 350 cycle heterodyne signal developed by the receiver 38 and passed by the filter 43, thereby producing a 100 cycle double heterodyne signal for application through the band pass filter 47 to the left hand set of input terminals of the phase meter 49. To provide a reference signal for phase comparison with this 100 cycle double heterodyne signal, the 250 cycle reference signal passed by the filter 40 is mixed by the mixer 46 with the 350 cycle modulation signal reproduced by the receiver 39 and passed by the filter 44, thereby developing a second 100 cycle double heterodyne signal for application through the filter 48 to the right hand set of input terminals. The two double heterodyne signals impressed upon the two sets of input terminals of the phase meter 49 are phase compared by this meter to produce an indication of the phase relationship therebetween. For reasons which will be apparent from an understanding of the difference frequency principle as fully disclosed in United States Patent No. 2,652,559 to James E. Hawkins granted September 15, 1953, and assigned to the same assignee as the present application, it will be understood that the phase relationship between the 100 cycle double heterodyne signals applied to the input terminals of the phase meter 49 varies as a direct function of the position of the antenna 37 relative to two adjacent isophase lines having the antennas 15 and 16 at the two transmitters 10 and 11 as foci. These isophase lines have a spacing which is determined by the difference between the mean or average frequencies of the two sets of signals radiated from the two transmitters 10 and 11. More specifically, along the base line connecting the two antennas 15 and 16 this spacing is equal to one-half the wave length of a signal having a frequency of about 100 kilocycles, a distance of approximately 4920 feet, which is some 20 times greater than the spacing between the isophase lines relative to which position indications are provided by the phase meter 42 of the fine or narrow lane position indicating facilities. The accuracy of the coarse lane position indicating facilities including the phase meter 49 is, of course, far less than that of the fine or narrow lane position indicating facilities including the meter 42. It has been found, however, that when the coarse or wide lane position indicating facilities operates on lane widths which are approximately twenty times greater than the width of the lanes within which the fine or narrow lane position indicating facilities operate, the accuracy of the coarse or wide lane facilities is entirely adequate to insure identification of the particular lane in which fine indications are being provided by the fine or narrow lane position indicating facilities.

For the purpose of ascertaining the location of the antenna 37 along the particular isophase line identified by the indication on the phase meter 49, the coarse position indicating facilities including the phase meter 59 at the mobile receiver 14 provides a second coarse or wide lane position indication in exactly the same manner as the production of the indication by the described facilities including the phase meter 49. Thus the 650 cycle heterodyne signal appearing at the output of the filter 51 is mixed by the mixer 55 with the 850 cycle heterodyne signal developed at the output of the receiver 38 and passed by the filter 53 in order to provide a 200 cycle double heterodyne signal for application through the band pass filter 57 to the left hand set of input terminals of the phase meter 59. To provide a reference signal for phase comparison with this 200 cycle double heterodyne signal, the 650 cycle modulation signal passed by the filter 50 is mixed by the mixer 56 with the 850 cycle modulation signal reproduced by the receiver 39 and passed by the filter 54, thereby developing a 200 cycle double heterodyne signal for application through the band pass filter 58 to the right hand set of input terminals of the phase meter 59. Here again, the coarse or wide lane position indicating facilities operate in accordance with the difference frequency principle previously referred to, with the result that the phase meter 59 provides position indications relative to widely spaced hyperbolic isophase lines having the radiating antennas 15 and 17 at the transmitters 10 and 12 as foci. The spacing between these adjacent isophase lines along the base line connecting the antennas 15 and 17 is in this case equal to one-half the wave length of a signal having a frequency of about 100 kilocycles. At this particular frequency and, as previously indicated, the minimum spacing between isophase lines is equal to 4920 feet which is again some twenty times greater than the spacing between adjacent isophase lines of the fine set with reference to which the phase meter 52 provides indications. Thus coarse or wide lane positions are provided by the phase meter 59 having an accuracy sufficient to identify the particular pair of isophase lines relative to which the phase meter 52 is providing indications.

It should be understood that the coarse or wide lane position indications could be produced, if desired, by other methods than the described arrangement in which the output signals of the band pass filters at the mobile receiver are heterodyned in order to provide double heterodyne signals for phase comparison. Thus, for example, the signals passed by these filters could be employed in a mechanical mixing arrangement of the type described in the above identified Patent No. 2,652,559 to James E. Hawkins.

From the above explanation it will be understood that an absolute determination of the position of the receiving antenna 37 within the area of effective reception of signals radiated from the three transmitters 10, 11 and 12 is obtained. Since the transmitters 10, 11 and 12 continuously radiate pairs of position indicating signals and since the pair of signals radiated by the center transmitter 10 are continuously modulated with pairs of reference signals, the phase meters 42, 49, 52 and 59 provide continuous indications representative of the location of the mobile receiver 14 at all times. It will also be apparent that these continuous indications are provided while employing transmitting facilities comprising transmitters 10, 11 and 12 and reference receiver 13, which include a minimum of equipment since only three transmitters, two receivers and two modulators are required.

A modified embodiment of the present improved radio location system is illustrated to Fig. 2 which discloses a system differing from that shown in Fig. 1 principally by eliminating the necessity for modulating pairs of reference signals upon the two position indicating signals radiated by the center transmitter. Specifically, the system shown in Fig. 2 comprises a reference receiver 113 preferably spaced from four transmitters or transmitting units 110a, 110b, 111 and 112 for radiating position indicating signals to any number of mobile receivers one of which is designated by the reference character 114. The transmitters 111 and 112 are respectively identical to the units 11 and 12 previously described and have been assigned the same operating frequencies. The spaced transmitting units 110a and 110b, taken together, perform the functions of the transmitting unit 10 in the system previously described. In particular, the transmitting unit 110a comprises a pair of oscillators 118 and 119 for developing output signals having frequencies of 2000.25 kilocycles and 2000.35 kilocycles, respectively, a linear mixer 122 and a class B final amplifier 123 for impressing the output signals of the oscillators upon an antenna circuit including a single radiating antenna 115. The reference or link transmitter 110b which functions as a link transmitter for radiating reference signals to the mobile receiver 114 in order to obviate the aforementioned difficulties attendant upon phase synchronization of the position indicating signals radiated by the transmitters 110a, 111 and 112, comprises an oscillator 160 developing an output signal having a frequency of 2050 kilocycles, a modulator 161 and a power amplifier 162. The reference receiver 113 is identical to the reference receiver 13 previously described except for the addition of a linear mixer circuit 135b which combines the output of the frequency selective reject circuits 135 and 136 and permits all of the signals from the reference receiver 113 to be transmitted over a single set of signal connectors 135a to the link transmitter 110b. Since the receivers 133 and 134 at the reference receiver 113 are respectively tuned to frequencies differing by approximately 50 kilocycels from the 2050 kilocycle signal radiated by the link transmitter 110b, the reference receiver may be located adjacent to the link transmitter without incurring blocking problems at the receivers 133 and 134, thus avoiding the use of extremely long signal connectors 135a interconnecting these two units. To further minimize the possibility of receiver blocking, i. e., blocking of the receiver 134, the reference receiver 113 may be spaced a greater distance from the link transmitter 110b and an ultra high frequency or microwave link, utilizing a low power transmitter at the location of the reference receiver 113 and a receiver at the location of the link transmitter 110b, may be employed, in lieu of the conductors 135a, to transmit the signals appearing at the output terminals of the linear mixer 135b to the input terminals of the modulator 161.

The mobile receiver 114 is similar to the mobile receiver 14 previously described but differs therefrom primarily by the inclusion of a third receiver 163 center tuned to a frequency of 2050 kilocycle and designed to reproduce all of the reference signals modulated upon the carrier wave radiated by the link transmitter 110b. In addition to the inclusion of this third receiver at the mobile receiving unit 114 the band pass filters 140, 144, 150 and 154 are provided in order to effect the separation of the reproduced reference signals.

Turning now to the operation of the system shown in Fig. 2 it will be appreciated that each of the transmitters 110a, 111 and 112 continuously radiates a pair of carrier wave signals, all of these signals having a difference frequency but being grouped so that only two channels are utilized. Specifically, the 2000.25 kilocycle signal radiated from the transmitter 110a, the 2000 kilocycle signal radiated from the transmitter 111 and the 2000.9 kilocycle signal radiated from the transmitter 112 comprises a first group of three carrier wave signals whereas the 2100.35 kilocycle signal radiated by the transmitter 110a, the 2100 kilocycle signal radiated by the transmitter 111 and 2101.2 kilocycle signal radiated by the transmitter 112 comprises a second group of carrier wave signals, each group falling within a single frequency channel. The first group of carrier wave signals is received by the receiver 134 at the reference receiver 113 which heterodynes these three signals in pairs in order to reproduce three beat frequency signals having frequencies of 250 cycles, 650 cycles and 900 cycles. These reproduced signals are applied to the frequency selective reject circuit 136 which rejects the 900 cycle signal but passes the other two signals to the linear mixer 135b. Similarly, the receiver 133 at the reference receiver 113 receives all of the waves of the second group radiated by the transmitters 110a, 111 and 112 and heterodynes these three signals in pairs in order to develop three beat frequency signals having frequencies of 350 cycles, 850 cycles and 1200 cycles. The three heterodyne signals reproduced by the receiver 133 are applied to the frequency reject circuit 135 which rejects the 1200 cycle signal but applies the other two signals to the linear mixer 135b. The output of the linear mixer comprising four low frequency signals, is applied through the signal connectors 135a to the modulator 161 for amplitude modulation upon the signal developed by the oscillator 160 of the link transmitter 110b. Since the signal developed by the oscillator 160 at the link transmitter is separated in frequency by approximately 50 kilocycles from each of the signals radiated by the transmitters 110a, 111 and 112 selective reception of the modulated signal radiated by the link transmitters and the pairs of unmodulated signals radiated by the transmitters 110a, 111 and 112 is facilitated. Thus the receivers 133 and 134 at the reference receiver 113 are sufficiently selective to reject the modulated carrier wave radiated by the link transmitter 110b with the result that no modulation signals appear at the output terminals of these receivers. To summarize briefly, each of the transmitters 110a, 111 and 112 radiates a pair of unmodulated carrier wave signals each having different frequencies whereas the link transmitter 110b radiates a single carrier wave signal having a still different frequency which is simultaneously modulated with four reference signals applied thereto from the reference receiver 113.

The single receiving antenna 137 at the mobile receiver 114 collects all of these signals and applies them to the input terminals of the receivers 138, 139 and 163. The receiver 163 rejects all of the carrier waves radiated by the transmitters 110a, 111 and 112 but accepts the modulated carrier wave radiated by the link transmitter 110b and reproduces at its output terminals the four modulation signals appearing thereon. The band pass filters 140, 144, 150 and 154, each having input terminals connected to the output terminals of the receiver 163, function to separate the four reproduced reference signals since each of these filters passes only one of the reproduced signals and rejects the other three. The receiver 139, on the other hand, accepts the first group of carrier waves radiated by the transmitters 110a, 111 and 112 but rejects both the second group of carrier waves radiated by these transmitters and the modulated carrier wave radiated by the link transmitter 110b. The receiver 139 heterodynes in pairs the three carrier waves accepted thereby and reproduces three beat frequency signals having frequencies of 250 cycles, 650 cycles and 900 cycles. The three beat frequency signals reproduced by the receiver 139 are simultaneously applied to the input terminals of the band pass filters 141 and 151 but since both of these filters reject the 900 cycle beat frequency signal this particular signal is prevented from affecting the operation of the mobile receiver 114. The 250 cycle heterodyne signal reproduced by receiver 139 is passed by the filter 141 and in like manner the 650 cycle heterodyne signal is passed by the filter 151. The 250 cycle signals passed by the filters 140 and 141 are phase compared by the phase meter 142 in order to provide a fine or narrow lane position indication in the manner previously described. The 650 cycle signals passed by the filters 150 and 151 are phase compared by the phase meter 152 in order to provide a second fine or narrow lane position indication also in the manner previously described.

The receiver 138 at the mobile receiver 114 rejects the first group of carrier waves radiated by the transmitters 110a, 111 and 112 and also rejects the modulated wave radiated by the link transmitter 110b but this receiver accepts the three carrier waves of the second group radiated by the transmitters 110a, 111 and 112. The three carrier waves accepted by the receiver 138 are heterodyned in pairs in order to reproduce three heterodyne signals having frequencies of 350 cycles, 850 cycles and 1200 cycles. These three signals are simultaneously applied to the input terminals of the band pass filters 143 and 153.

Both of these filters reject the 1200 cycle heterodyne signal applied thereto and prevent this signal from disturbing the operation of the mobile receiver 114. The band pass filter 143 passes the 350 cycle heterodyne signal reproduced by the receiver 138 while the band pass filter 153 passes the 850 cycle heterodyne signal developed by this receiver. The coarse position indicating facilities including the band pass filters 140, 141, 143 and 144, mixers 145 and 146, 100 cycle band pass filters 147 and 148 and the phase meter 149 provide coarse or wide lane position indications indicative of the position of the mobile receiving unit relative to widely spaced hyperbolic isophase lines having foci at the antennas 115 and 116 at the units 110a and 111 in the manner previously described. Similarly a second coarse or wide lane position indication is provided by the coarse position indicating facilities comprising the band pass filters 150, 151, 153 and 154, mixers 155 and 156, 200 cycle band pass filters 157 and 158 and the phase meter 159. This second coarse position indication is indicative of the position of the receiving antenna 137 relative to adjacent widely spaced hyperbolic isophase lines having foci at the antennas 115 and 117 of the transmitters 110a and 112. Thus a pair of high phase sensitivity indications and a pair of low phase sensitivity indications are continuously provided by the phase meters 142, 149, 152 and 159 at the mobile receiver 114 in order to effect an absolute determination of the position of the receiving antenna 137 within the area of effective reception of signals radiated from the four transmitters 110a, 110b, 111 and 112.

From the foregoing explanation it will be apparent that the present invention affords a solution to the problem of ambiguity resolution by providing both high and low phase sensitivity indications while employing a maximum of three channel frequencies. Furthermore, the system shown in Fig. 1 solves this problem by utilizing only two channel frequencies and, accordingly, represents a distinct improvement over the systems heretofore proposed by reducing the amount of equipment employed while, at the the same time, obviating receiver blocking problems. Moreover, it is apparent that standard components are employed throughout the transmitting and receiving facilities thus providing economy in equipment cost and eliminating the necessity for specially designed or extremely delicate equipment.

While particular embodiments of the invention have been shown, it will be understood, of course, that the invention is not limited thereto since many modifications may be made and it is, therefore, contemplated by the appended claims to cover any such modifications as fall within the true spirit and scope of the invention.

What is claimed as new and desired to be secured by Letters Patent is:

1. In a position determining system, at least three spaced transmitting units each continuously radiating at least two carrier waves to a receiving point, a reference receiver including a pair of heterodyning means each responsive to only one of the waves radiated by each of said three units and each heterodyning in pairs the three waves to which it is responsive in order to produce a plurality of beat frequency signals, and means for radiating to said receiving point at least four reference signals having different frequencies respectively related to the frequency of the produced beat frequency signals.

2. In a position determining system, at least three spaced transmitting units each continuously radiating at least two carrier waves to a receiving point, all of said waves having a different frequency, a reference receiver spaced from each of said three transmitting units and including a pair of heterodyning means each responsive to only one of the waves radiated by each of said three units and each heterodyning in pairs the three waves to which it is responsive in order to produce a plurality of beat frequency signals, and means for radiating to said receiving point at least four reference signals having frequencies respectively related to the frequencies of the produced beat frequency signals.

3. In a position determining system, at least three spaced transmitting units continuously radiating at least two carrier waves to a receiving point, a reference receiver including a pair of heterodyning means each responsive to only one of the waves radiated by each of said three units and each heterodyning in pairs the three waves to which it is responsive in order to produce at least three beat frequency signals, frequency selective means associated with each of said heterodyning means to pass only two of the beat frequency signals produced by each of the heterodyning means, and means for radiating to said receiving point four reference signals having frequencies respectively related to the four signals passed by the frequency selective means.

4. In a position determining system, at least three spaced transmitting units each continuously radiating at least two carrier waves to a receiving point, a reference receiver including a first heterodyning means responsive to only one of the waves radiated by each of said three units for heterodyning in pairs said one waves to produce at least three difference frequency signals, means for radiating to said receiving point at least two reference signals having frequencies respectively related to at least two of said difference frequency signals, a second heterodyning means at said reference receiver responsive to the other wave radiated by each of said three units for heterodyning in pairs said other waves to produce at least three other beat frequency signals, and means for radiating to said receiving point at least two reference signals having frequencies respectively related to at least two of said other beat frequency signals.

5. In a position determining system, at least three spaced transmitting units each continuously radiating at least two carrier waves to a receiving point, a reference receiver including a first heterodyning means responsive to only one of the waves radiated by each of said three units for heterodyning in pairs said one waves to produce at least three beat frequency signals, a first frequency selective means for rejecting at least one of the beat frequency signals produced by said first heterodyning means and for passing at least two of said beat frequency signals, means for radiating to said receiving point at least two reference signals having frequencies respectively related to the beat frequency signals passed by the first frequency selective means, a second heterodyning means at said reference receiver responsive to the other wave radiated by each of said three units for heterodyning in pairs said other waves to produce at least three other beat frequency signals, a second frequency selective means for rejecting at least one of the beat frequency signals produced by said second heterodyning means and for passing at least two of said other beat frequency signals, and means for radiating to said receiving point at least two reference signals having frequencies respectively related to the other beat frequency signals passed by the second frequency selective means.

6. A wave signal transmission system comprising a plurality of spaced transmitting units each including means for continuously radiating at least two carrier waves, a plurality of heterodyning means respectively responsive to pairs of signals derived from the carrier waves radiated by said transmitting units to produce beat frequency signals having frequencies respectively related to the beat frequencies between the pairs of signals, and means associated with one of said transmitting units for modulating different ones of said beat frequency signals upon each of the carrier waves radiated by said one transmitting unit.

7. A wave signal transmission system comprising a plurality of spaced transmitting units each including means for continuously radiating at least two carrier waves, a pair of heterodyning means each responsive to one of the carrier waves radiated by each of said transmitting units to produce two groups of beat frequency signals having frequencies respectively related to the beat frequencies between the heterodyned waves, means for modulating at least two of the beat frequency signals of the first group upon one of the carrier waves radiated by one of said transmitting units, and means for modulating at least two of the beat frequency signals of the second group upon the other carrier wave radiated by said one transmitting unit.

8. A wave signal transmission system comprising a plurality of spaced transmitting units each including means for continuously radiating at least two carrier waves, all of said waves having a different frequency, at least two heterodyning means each responsive to one of the two carrier waves radiated by each of said transmitting units and each producing three beat frequency signals having frequencies respectively related to the beat frequencies between pairs of heterodyned waves, frequency selective means associated with each of said heterodyning means for rejecting one of the three reproduced beat frequency signals and for passing the other two beat frequency signals, and means for respectively modulating the two carrier waves radiated by one of said transmitting units with pairs of reference signals having frequencies respectively related to the two beat frequency signals passed by each of the frequency selective means.

9. A wave signal transmission system comprising at least three spaced transmitting units for continuously radiating two groups of carrier waves of different frequency, each group including at least three waves, a reference receiver including at least two heterodyning means respectively responsive to a different group of said carrier waves and each producing at least three beat frequency signals having frequencies respectively related to the beat frequencies between pairs of the carrier waves of each group, and means for modulating each of the carrier waves radiated by one of said transmitting units with at least two reference signals having frequencies respectively related to the beat frequencies produced by said heterodyning means.

10. A wave signal transmission system comprising at least three spaced transmitting units for continuously radiating two groups of carrier waves all having different frequency, each group including at least three waves each transmitting unit including means for radiating one wave of each group, a reference receiver including at least two heterodyning means respectively responsive to a different group of said carrier waves and each operative to produce at least three beat frequency signals having frequencies respectively related to the beat frequencies between pairs of the three carrier waves of each group, frequency selective means associated with each of said heterodyning means for rejecting at least one of the frequencies produced by each of the heterodyning means and for passing at least two of the beat frequency signals produced by each of said heterodyning means, and means for modulating each of the carrier waves radiated by one of said transmitting units with pairs of reference signals having frequencies respectively related to the frequencies of the beat frequency signals passed by each of the frequency selective means.

11. In a position determining system, three spaced transmitting units each continuously radiating at least two carrier waves to a receiving point, a reference receiver including a pair of heterodyning means each responsive to only one of the waves radiated by each of said three units and each heterodyning in pairs the three waves to which it is responsive in order to produce the beat frequencies therebetween, and means for modulating at least four of said beat frequency signals upon a common carrier wave for space radiation to said receiving point.

12. In a position determining system, three spaced transmitting units each continuously radiating at least two carrier waves to a receiving point, a pair of heterodyning means each responsive to only one of the waves radiated by each of said three units and each heterodyning in pairs the three waves to which it is responsive in order to produce the beat frequencies therebetween, and a link transmitter for radiating a carrier wave having a different frequency from the pairs of carrier waves radiated by said three transmitting units, and means for modulating at least four of the beat frequency signals reproduced by said pair of heterodyning means upon the carrier wave radiated by said link transmitter.

13. In a position determining system, three spaced transmitting units each continuously radiating at least two carrier waves to a receiving point, a reference receiver spaced from each of said three transmitting units and including a pair of heterodyning means each responsive to only one of the waves radiated by each of said three units and each heterodyning in pairs the three waves to which it is responsive in order to produce the beat frequencies therebetween, and means for modulating at least four of said beat frequency signals upon a common carrier wave for space radiation to said receiving point.

14. In a position determining system, three spaced transmitting units each continuously radiating at least two carrier waves to a receiving point, a reference receiver spaced from each of said three transmitting units and including a pair of heterodyning means each responsive to only one of the waves radiated by each of said three units and each heterodyning in pairs the three waves to which it is responsive in order to produce a plurality of beat frequency signals, and a link transmitter for radiating a carrier wave having a different frequency from the pairs of carrier waves radiated by said three transmitting units, and means for modulating at least four of the beat frequency signals reproduced by said pair of heterodyning means upon the carrier wave radiated by said link transmitter.

15. In a position determining system, three spaced transmitting units each continuously radiating at least two carrier waves to a receiving point, a reference receiver spaced from each of said three transmitting units and including a pair of heterodyning means each responsive to only one of the waves radiated by each of said three units and each heterodyning in pairs the three waves to which it is responsive in order to produce at least three beat frequency signals, frequency selective means associated with each of said heterodyning means to pass only two of the beat frequency signals reproduced by each of the heterodyning means, a link transmitter for radiating a carrier wave having a different frequency from the pairs of carrier waves radiated by said three transmitting units, and means for modulating the four signals passed by said frequency selective means upon the carrier wave radiated by said link transmitter.

16. Wave signal receiving apparatus for translating received space radiated waves into position indications comprising; a first receiver for receiving at least two pairs of continuously radiated unmodulated waves and at least one continuously radiated modulated wave having at least two reference signals of different frequency modulated thereon, for reproducing said reference signals, and for heterodyning said pairs of carrier waves to produce at least two beat frequency signals; a second receiver for receiving at least two other pairs of unmodulated continuously radiated waves having difference frequencies between the pairs of waves respectively related to the frequencies of the reference signals reproduced by said first receiver, for receiving at least one continuously radiated modulated wave having at least two modulation signals respectively related in frequency to the beat frequency signals reproduced by said receiver, for reproducing said modulation signals, and for heterodyning said other pairs of unmodulated signals to produce at least two difference frequency signals; means jointly responsive to one of said reference signals and to the first of said difference frequency signals to which said one reference signal is related for providing a first position indication; means jointly responsive to one of said modulation signals and to the first of said beat frequency signals to which said one modulation signal is related for providing a second position indication; means jointly responsive to said one reference signal, to the second of said modulation signals, to said first difference frequency signal and to the second of said beat frequency signals for providing a third position indication; and means jointly responsive to said one modulation signal, to said first beat frequency signal, to the second of said reference signals and to the second of said difference frequency signals for providing a fourth position indication.

17. Wave signal receiving apparatus for translating received space radiated waves into position indications comprising: a first receiver for receiving at least two pairs of continuously radiated unmodulated waves and at least one continuously radiated modulated wave having at least two reference signals of different frequency modulated thereon for reproducing said reference signals, and for heterodyning said pairs of carrier waves to produce at least two beat frequency signals; filtering means associated with said first receiver for separating said two reference signals and said two beat frequency signals into four distinguishable signals, a second receiver for receiving at least two other pairs of unmodulated continuously radiated waves having difference frequencies between the pairs of waves respectively related to the frequencies of the reference signals reproduced by said first receiver, for receiving at least one continuously radiated modulated wave having at least two modulation signals respectively related in frequency to the beat frequency signals reproduced by said receiver, for reproducing said modulation signals, and for heterodyning said other pairs of unmodulated signals to produce at least two difference frequency signals; filtering means associated with said second receiver for separating said two modulation signals and said two difference frequency signals into four distinguishable signals, means jointly responsive to one of said reference signals and to the first of said difference frequency signals to which said one reference signal is related for providing a first position indication; means jointly responsive to one of said modulation signals and to the first of said beat frequency signals to which said one modulation signal is related for providing a second position indication; means jointly responsive to said one reference signal, to the second of said modulation signals, to said first difference frequency signal and to the second of said beat frequency signals for providing a third position indication; and means jointly responsive to said one modulation signal, to said first beat frequency signal, to the second of said reference signals and to the second of said difference frequency signals for providing a fourth position indication.

18. Wave signal receiving apparatus for translating received space radiated waves into position indications comprising, a first receiver for receiving at least two pairs of continuously radiated unmodulated waves and for heterodyning said pairs of waves to produce first and second beat frequency signals, a second receiver for receiving at least two other pairs of continuously radiated unmodulated waves and for heterodyning said other pairs of waves to produce third and fourth beat frequency signals, a third receiver for receiving at least one continuously radiated modulated wave including at least four reference signals as modulation components, said four reference signals having frequencies respectively related to said first, second, third and fourth beat frequency signals, means jointly responsive to said first beat frequency signal and to the first of said reference signals for providing a first fine position indication, means jointly responsive to said second beat frequency signals and to the second of said reference signals for providing a second fine position indication, means jointly responsive to said first beat frequency signal, to said third beat frequency signal, to said first reference signal and to the third of said reference signals for providing a first coarse position indication, and means jointly responsive to said second beat frequency signal, to said fourth beat frequency signal, to said second reference signal and to the fourth of said reference signals for providing a second coarse position indication.

19. Wave signal receiving apparatus for translating received space radiated waves into position indications comprising, a first receiver for receiving at least two pairs of continuously radiated unmodulated waves and for heterodyning said pairs of waves to produce first and second beat frequency signals, filtering means associated with said first receiver for separating said first and second beat frequency signals, a second receiver for receiving at least two other pairs of continuously radiated unmodulated waves for heterodyning said other pairs of waves to produce third and fourth beat frequency signals, filtering means associated with said second receiver for separating said third and fourth beat frequency signals, a third receiver for receiving at least one continuously radiated modulated wave including at least four reference signals as modulation components, said four reference signals having frequencies respectively related to said first, second, third and fourth beat frequency signals, filtering means associated with said third receiver for separating said four reference signals, means jointly responsive to said first beat frequency signal and to the first of said reference signals for providing a first fine position indication, means jointly responsive to said second beat frequency signals and to the second of said reference signals for providing a second fine position indication, means jointly responsive to said first beat frequency signal, to said third beat frequency, to said first reference signal and to the third of said reference signals for providing a first coarse position indication, and means jointly responsive to said second beat frequency signal, to said fourth beat frequency signal, to said second reference signal and to the fourth of said reference signals for providing a second coarse position indication.

20. In a position determining system, at least three spaced transmitting units each continuously radiating at least two carrier waves to a receiving point, a reference receiver including a pair of heterodyning means each responsive to only one of the waves radiated by each of said three units and each heterodyning in pairs the three waves to which it is responsive in order to produce a plurality of beat frequency signals, and receiving and translating apparatus at said receiving point responsive to the pairs of carrier waves radiated by said transmitting units and to said reference signals for providing a first pair of indications representative of the location of said receiving point relative to a first and second of said transmitting units and for providing a second pair of indications representative of the location of said receiving point relative to the first and third of said transmitting units.

References Cited in the file of this patent

UNITED STATES PATENTS

| 2,148,267 | Honore | Feb. 21, 1939 |
| 2,652,558 | Hawkins | Sept. 15, 1953 |
| 2,652,559 | Hawkins | Sept. 15, 1953 |